United States Patent
Doerr

(10) Patent No.: US 7,373,039 B1
(45) Date of Patent: May 13, 2008

(54) LOW-RIPPLE OPTICAL DEVICE

(75) Inventor: Christopher Doerr, Middletown, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 11/617,316

(22) Filed: Dec. 28, 2006

(51) Int. Cl.
*G02B 6/28* (2006.01)
*H04J 14/02* (2006.01)

(52) U.S. Cl. .................. 385/24; 385/14; 385/37; 385/42; 385/132; 398/79; 398/82; 398/84

(58) Field of Classification Search ............... 385/42, 385/14, 37, 9, 10, 129, 130, 131, 24, 40; 398/79, 82, 84, 85, 87
See application file for complete search history.

(56) References Cited

U.S. PATENT DOCUMENTS

| | | | | | |
|---|---|---|---|---|---|
| 5,488,680 | A | * | 1/1996 | Dragone | 385/24 |
| 6,049,644 | A | * | 4/2000 | Dragone | 385/37 |
| 6,141,467 | A | * | 10/2000 | Doerr | 385/24 |
| 6,421,478 | B1 | * | 7/2002 | Paiam | 385/24 |

* cited by examiner

*Primary Examiner*—Brian M. Healy

(57) ABSTRACT

A low-ripple optical device comprising an optical demultiplexer structure and an optical multiplexer structure cascaded together wherein one of the structures exhibits n passband maxima and the other device exhibits n+1 passband maxima.

7 Claims, 4 Drawing Sheets

LOW-RIPPLE OPTICAL DEVICE

FIELD OF THE INVENTION

This invention relates generally to the field optical communications and in particular to a low-ripple optical device for use in wavelength-division-multiplexed (WDM) optical networks.

BACKGROUND OF THE INVENTION

Present day optical communications networks employ a great number of optical multiplexers and demultiplexers. When implemented as planar lightwave circuits, however demultiplexers oftentimes exhibit a passband having significant ripple. This is due to a trade-off made between ripple and sidewall steepness inherent to filter design.

SUMMARY OF THE INVENTION

I have developed—according to the present invention—a low ripple optical device comprising a demultiplexer and a multiplexer concatenated together wherein the demultiplexer exhibits n passband maxima while the multiplexer exhibits n+1 passband maxima.

Viewed from a first aspect, the multiplexer may exhibit an odd number of passband maxima while the demultiplexer may exhibit an even number of passband maxima. Viewed from another aspect, the multiplexer may exhibit an even number of passband maxima while the demultiplexer may exhibit an odd number.

As can be appreciated, the concatenation of the two substantially cancels out any individual ripple, thereby making systems constructed from the device themselves capable of being cascaded.

Viewed from yet another advantageous aspect of the present invention, the device is relatively straightforward to manufacture using planar lightwave methodologies and materials.

BRIEF DESCRIPTION OF THE DRAWING

A more complete understanding of the present invention may be realized by reference to the accompanying drawings in which:

FIG. 4(b) multiplexer and FIG. 4(c) NET of the demultiplexer and multiplexer according to the present invention.

DETAILED DESCRIPTION

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

Figure 1:
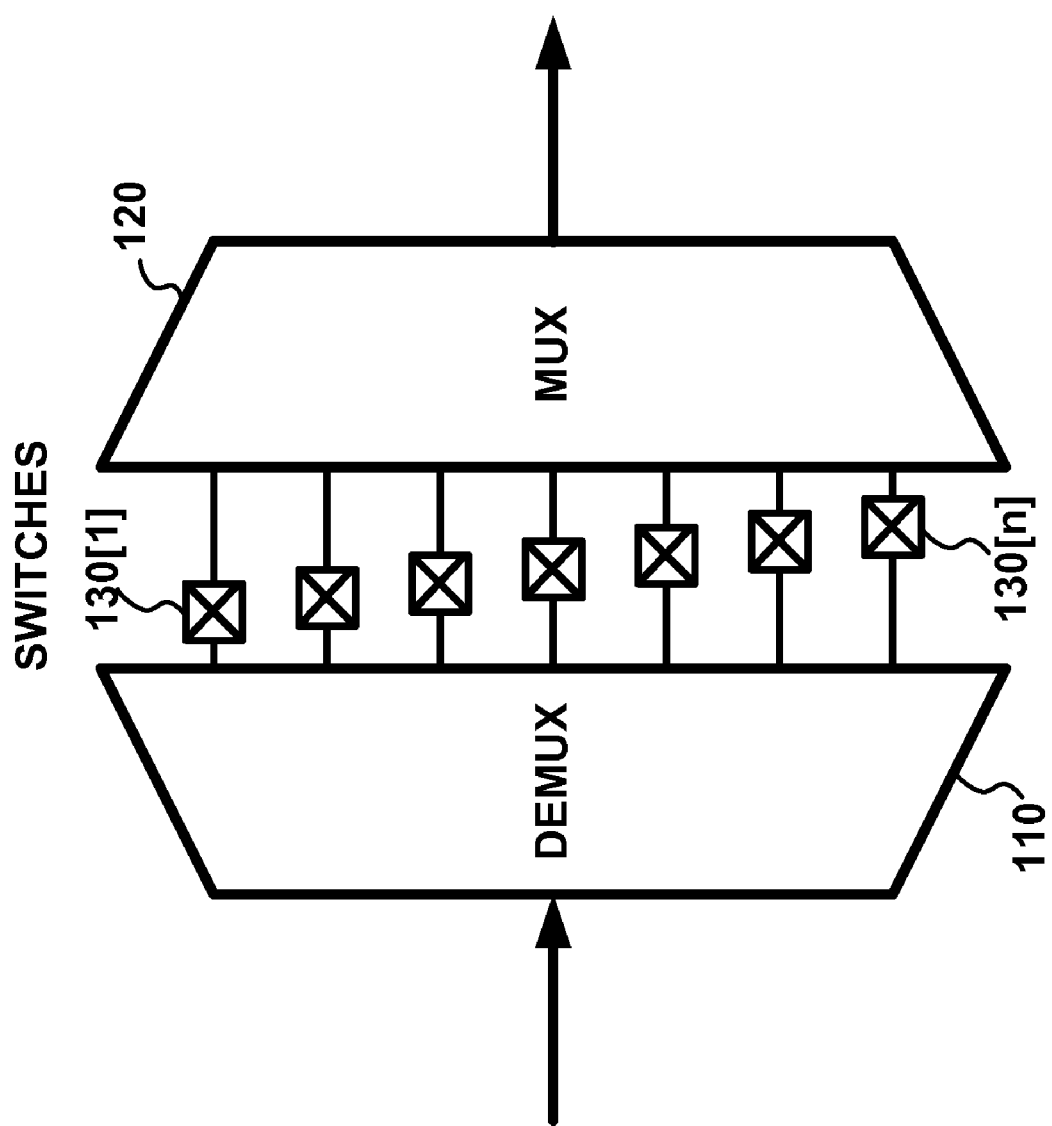
FIG. 1 is a schematic of an optical device having a wavelength demultiplexer and multiplexer cascaded according to the present invention.

With initial reference to FIG. 1, there is shown a schematic of an optical device 100 including a demultiplexer 110 and a multiplexer 120 optically cascaded together. Shown in this FIG. 1 are a plurality of switches 130[1] . . . 130[$n$] which may be optionally interposed therebetween in a deployed network environment.

Figure 2:
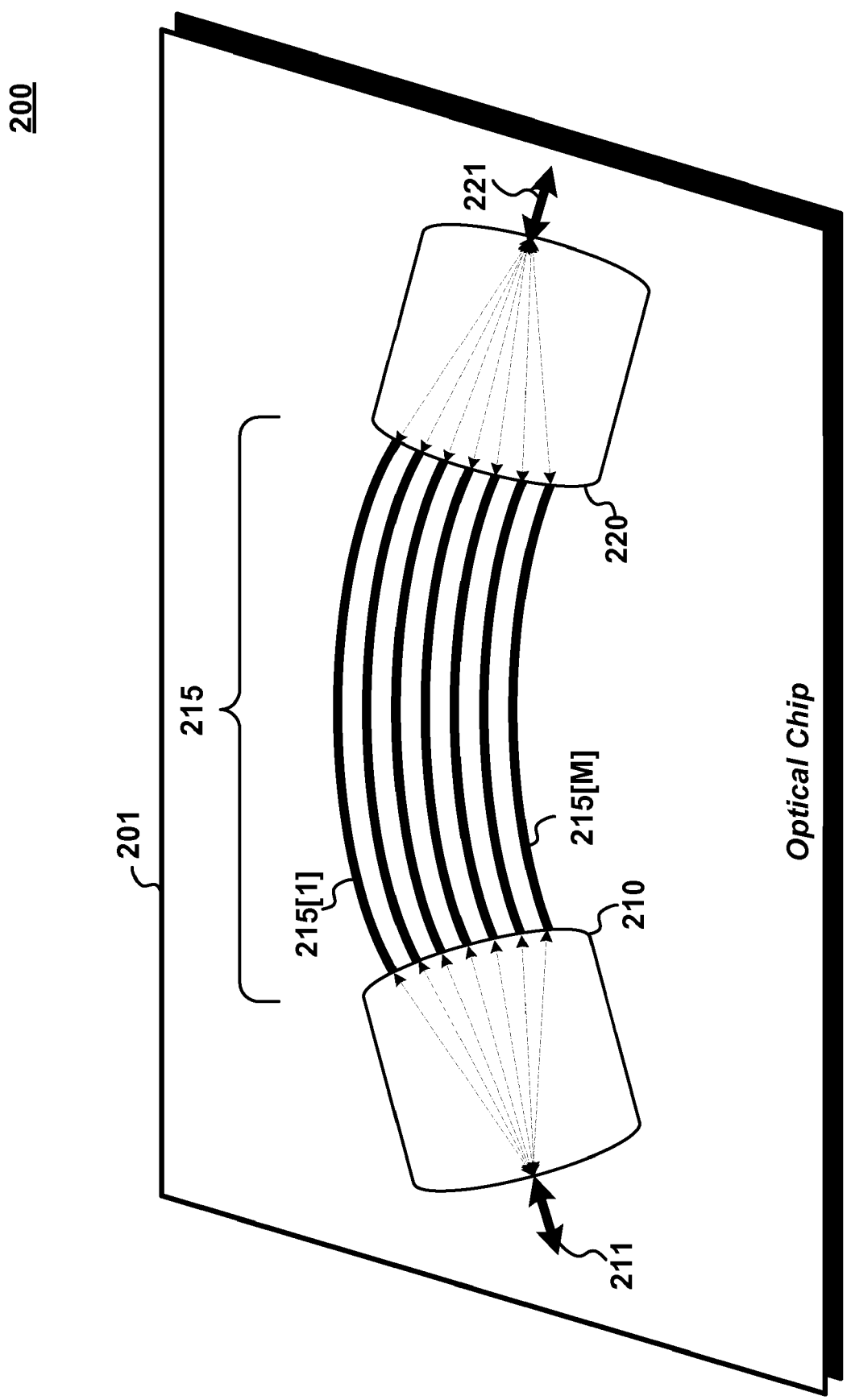
FIG. 2 is a of a wavelength demultiplexing/multiplexing apparatus which may be preferably used in the present invention.

Turning now to FIG. 2, those skilled in the art will quickly recognize the well-known "frequency routing device" 200 which may operate as a multiplexer and demultiplexer of optical frequencies. Such frequency routing devices, are well known in the art and are described in more detail in U.S. Pat. No. 5,002,350 which issued to Dragone on Jan. 30, 1996, the entire contents of which are hereby incorporated by reference. As further known by those skilled in the art, such devices are often referred to as arrayed waveguide gratings (AWGs).

Star coupler(s) 210, 220 each include a plurality of input ports connected to a plurality of output ports via a free space region. The plurality (M) of output ports (for coupler 210) are connected to the M waveguides 215[1] . . . 215[M], which provide a pre-determined amount of path length difference to a corresponding plurality (M) of input ports of star coupler 220. Preferably, these devices are formed from waveguides and integrated onto an optical "chip" 201 and each of the couplers may include one or more input and/or output waveguides 211, 221.

Figure 3:
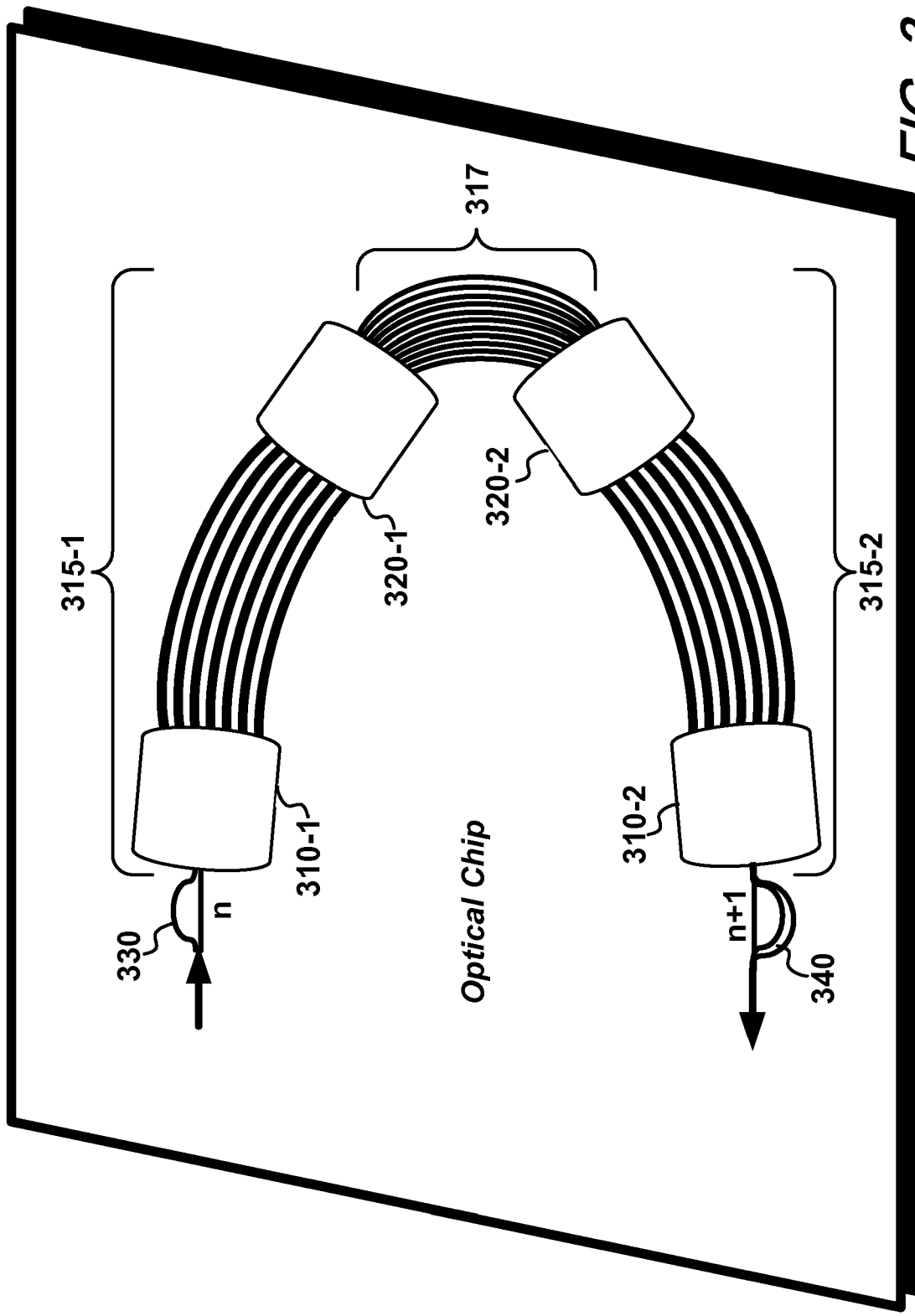
FIG. 3 is a schematic of an optical device according to the present invention employing planar demultiplexing/multiplexing apparatus of FIG. 2.

With these preliminary structures described, we may now describe more particularly the low-ripple optical apparatus according to the present invention. With reference to FIG. 3, there is shown a cascaded arrangement of an optical demultiplexer 315-1 and an optical multiplexer 315-2 optically cascaded to one another by one or more connecting waveguides/fibers 317. As can be further observed from this FIG. 3, the waveguide structures 330, 340 providing input/output to/from the demultiplexer/multiplexer structure exhibit a recognizable auxiliary interferometer connected to each AWG wherein one of the auxiliary interferometers exhibits "n" arms while the other exhibits "n+1" such arms. Stated alternatively, one of the structures has an odd number of arms while the other has an even number.

As described in U.S. Pat. Nos. 5,488,680 and 6,728,446 which are incorporated herein by reference as if set forth at length, the auxiliary interferometers allow the AWG to exhibit a "flat-top" passband without inherent insertion loss.

Figure 4:
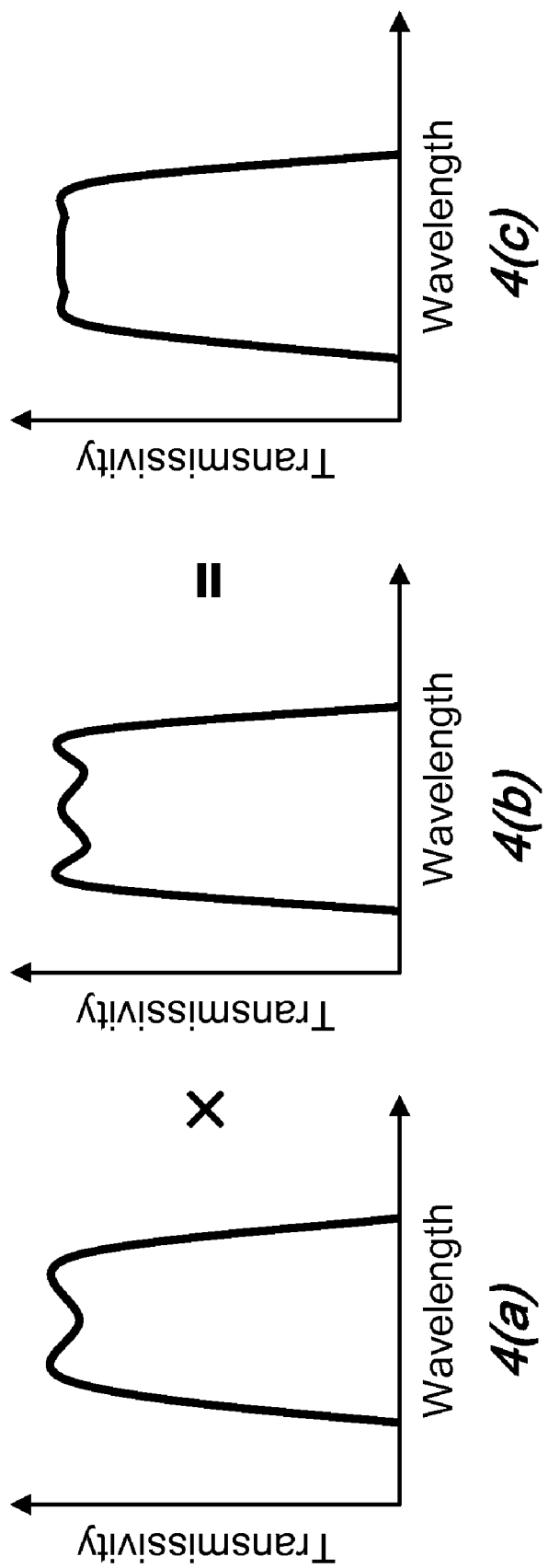
FIG. 4 is a series of graphs showing transmissivity vs. wavelength for FIG. 4(a) demultiplexer.

When configured in this manner, the devices will exhibit a particular number of passband maxima, i.e., two (2) or three (3), which corresponds to the number of arms on a particular device's Mach-Zehnder structure. With reference now to FIG. 4, there it is shown a series of graphs of transmissivity vs. wavelength for a device having 3 passband maxima FIGS. 4(a) and 2 passband maxima FIG. 4(b) and the NET passband for a concatenated structure FIG. 4(c). As can be readily appreciated by those skilled in the art, the NET passband depicted in FIG. 4(c) exhibits a highly desirable low ripple.

At this point, while we have discussed and described our invention using some specific examples, those skilled in the art will recognize that our teachings are not so limited. In particular, the particular ordering of the passband arrangement is a matter of design choice so long as one of the devices exhibits one more passband maxima than the other device. Still further, the number of arms in a particular auxiliary interferometer is also a matter of design choice so long as the principles discussed herein are maintained. Accordingly, our invention should be only limited by the scope of the claims attached hereto.

What is claimed is:

1. A low-ripple optical device comprising:
   an optical demultiplexing structure;
   an optical multiplexing structure, optically cascaded to the optical demultiplexing structure by one or more connecting optical paths;
   CHARACTERIZED IN THAT:
   one of the structures exhibits n passband maxima in each connecting optical path while the other structure exhibits n+1 passband maxima in each connecting optical path wherein the overall optical device exhibits a low net passband ripple.

2. The optical device of claim 1 further CHARACTERIZED IN THAT one of the structures includes an auxiliary interferometer optically coupled to an input of that one structure while the other structure includes an auxiliary interferometer optically coupled to an output of that other structure.

3. The optical device of claim 2 further CHARACTERIZED IN THAT one of the auxiliary interferometers has n optical paths while the other auxiliary interferometers has n+1 optical paths.

4. The optical device of claim 3 further CHARACTERIZED IN THAT one of the auxiliary interferometers exhibit a Mach-Zehnder geometry.

5. A method of generating a low-ripple optical signal comprising the steps of:
   applying an optical signal to the input of an optical device comprising an optical demultiplexer structure and an optical multiplexer structure cascaded together by one or more connecting optical paths; and
   receiving a low-ripple optical signal output from the device;
   wherein one of the optical structures exhibits n passband maxima in each connecting optical path and the other one of the optical structures exhibits n+1 passband maxima in each connecting optical path.

6. The optical device of claim 1 wherein said optical demultiplexing structure comprises:
   a first frequency routing device having at least one input port and P output ports;
   a second frequency routing device having at least P input ports and at least one output port, each output port of the second frequency routing device being connected to the one or more connecting optical paths; and
   P optical paths coupling the output ports of the first frequency routing device to the input ports of the second frequency routing device;
   and said optical multiplexing structure comprises:
   a third frequency routing device having at least one input port and P output ports, wherein each input port of the third frequency routing device is connected to the one or more connecting optical paths;
   a fourth frequency routing device having at least P input ports and at least one output port; and
   P optical paths coupling the output ports of the third frequency routing device to the input ports of the fourth frequency routing device.

7. The optical device of claim 5 wherein said optical demultiplexing structure comprises:
   a first frequency routing device having at least one input port and P output ports;
   a second frequency routing device having at least P input ports and at least one output port, each output port of the second frequency routing device being connected to the one or more connecting optical paths; and
   P optical paths coupling the output ports of the first frequency routing device to the input ports of the second frequency routing device;
   and said optical multiplexing structure comprises:
   a third frequency routing device having at least one input port and P output ports, wherein each input port of the third frequency routing device is connected to the one or more connecting optical paths;
   a fourth frequency routing device having at least P input ports and at least one output port; and
   P optical paths coupling the output ports of the third frequency routing device to the input ports of the fourth frequency routing device.

* * * * *